(12) United States Patent
Rainsberger et al.

(10) Patent No.: US 6,865,565 B2
(45) Date of Patent: Mar. 8, 2005

(54) RULE-BASED PERSONALIZATION FRAMEWORK FOR INTEGRATING RECOMMENDATION SYSTEMS

(75) Inventors: Joseph B. Rainsberger, Toronto (CA); Ramiah Kwok-Fai Tin, Pickering (CA); Tack Tong, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 09/847,771

(22) Filed: May 1, 2001

(65) Prior Publication Data

US 2002/0065745 A1 May 30, 2002

(30) Foreign Application Priority Data

Nov. 30, 2000 (CA) ............................................. 2327119

(51) Int. Cl.[7] ............................................. G06F 17/00
(52) U.S. Cl. .............................. 706/47; 706/45; 706/46
(58) Field of Search ...................................... 706/45–47

(56) References Cited

U.S. PATENT DOCUMENTS

| | | | | |
|---|---|---|---|---|
| 5,867,799 A | | 2/1999 | Lang et al. | ...................... 707/1 |
| 6,405,364 B1 | * | 6/2002 | Bowman-Amuah | ......... 717/101 |
| 6,473,851 B1 | * | 10/2002 | Plutowski | ...................... 713/1 |
| 6,662,357 B1 | * | 12/2003 | Bowman-Amuah | ......... 717/120 |
| 6,697,824 B1 | * | 2/2004 | Bowman-Amuah | ......... 709/229 |

OTHER PUBLICATIONS

A recommendation algorithm using multi–level association rules Choonho Kim; Juntae Kim; Web Intelligence, 2003. WI 2003. Proceedings. IEEE/WIC International Conference on , Oct. 13–17, 2003 pp.:524–527.*

Reinforcement learning architecture for Web recommendations Golovin, N.; Rahm, E.; Information Technology: Coding and Computing, 2004. Proceedings. ITCC 2004. International Conference on , vol.: 1 , Apr.5–7, 2004 pp.:398–402 vol.1.*

* cited by examiner

Primary Examiner—Anthony Knight
Assistant Examiner—Michael B. Holmes
(74) Attorney, Agent, or Firm—Gregory M. Plow

(57) ABSTRACT

A recommendation system includes a rule system for which defined recommendation system interfaces are available. The recommendation system interfaces are used in the action portion of predicate-action rules in the rule system to invoke non-rule-based systems. The non-rule-based systems provide recommendations to the rule system based on information passed to the non-rule-based systems on invocation and based on data made available to the non-rule-based systems. The rule system establishes a event-listener connection with the non-rule-based system to provide a data feed to the non-rule-based system.

44 Claims, 1 Drawing Sheet

RULE-BASED PERSONALIZATION FRAMEWORK FOR INTEGRATING RECOMMENDATION SYSTEMS

CLAIM OF PRIORITY

Applicants claim the foreign priority benefits under 35 U.S.C. §119 of Canadian Application No. 2,327,119 filed on Nov. 30, 2000.

FIELD OF THE INVENTION

The present invention is directed to an improvement in computing systems and in particular to an improvement in recommendation systems.

BACKGROUND OF THE INVENTION

In many types of computer systems, and in particular in sophisticated electronic commerce (e-commerce) sites, it is common for information provided to a user to be tailored to the user. In an e-commerce environment typically such personalized service is made available to users by server systems (often web servers) that are able to capture information to "learn" about a specific user. Based on this information about the user, an e-commerce system is able to provide catalogs, products, services and other information, all of which is targeted to that user. Such system is said to be personalized as the information is related to the system user.

At the heart of personalized e-commerce systems are recommendation technologies. There are many technologies available using differing approaches to presenting tailored information (collectively referred to as recommendations) to users. These include approaches based on rules, collaborative filtering, neural networks, data mining, and other artificial intelligence technologies. Such techniques for implementing a personalized system can be classified in two categories—those that are rule-based (declarative systems) and other non-rule-based (empirical systems).

Rules are declarative and are typically defined by a system author based on information provided by an expert in the knowledge domain pertaining to the e-commerce site in question. The other, non-rule-based, approaches may be described as falling within a "black-box" type of technology. Such approaches are empirical as they rely on data that is typically derived from traits and characteristics of the site users. A system based on such an approach is designed to provide recommendations without relying on expert knowledge of a relevant domain. Rather than an expert setting out the characteristics of the system based on domain knowledge, the system adapts to the domain of the site based on user interaction and other data available to the empirical recommendation system.

In the prior art, site designers typically choose between these two types of technologies when determining how to provide personalization in site designs. However, there are pros and cons associated with the technologies in both of the two categories. Rules are controllable and the results are deterministic. On the other hand, initial definition of the rules requires domain knowledge. Maintaining and updating the rules requires continued investment and expertise. Such an approach tends not to be adaptive or flexible.

The empirical type of personalization technology does not require the same degree of set-up and ongoing maintenance of domain knowledge. However, a system based on this type of technology is not as controllable, nor is the result deterministic. In the e-commerce context, such a system it is also likely to reach a result that, while potentially good for the user (or consumer) because it is based on recorded consumer characteristics, may not be in the best interest of the merchant or retailer.

Because systems are developed using a particular selected recommendation technology, where a particular approach is found not to meet the needs of a site, switching from that technology to another usually requires a substantial rewrite of personalization system interface on the site.

It is therefore desirable to have a recommendation system that may be used for e-commerce personalization that is able to utilize the strengths of both rule-based technologies and of empirical or non-rule-based technologies.

SUMMARY OF THE INVENTION

According to an aspect of the present invention there is provided an improved computer system for generating recommendations usable for personalization.

According to another aspect of the present invention there is provided a computer system for generating recommendations, the system comprising, a rule system comprising for defining a set of rules, each rule having a predicate component and an action component, a set of recommendation systems, and a defined interface for accessing each of the recommendation systems to permit the recommendation system to be invoked from an action component in a rule in the set of rules in the rule system.

According to another aspect of the present invention there is provided the above computer system in which the set of recommendation systems comprises one or more empirical recommendation systems.

According to another aspect of the present invention there is provided the above computer system further comprising a set connections, each connection comprising a means for passing data from the rule system to the empirical recommendation system for processing by the empirical recommendation.

According to another aspect of the present invention there is provided the above computer system in which the means for passing data from the rule system to the empirical recommendation system comprises an event-listener connection.

According to another aspect of the present invention there is provided the above computer system in which the rule system comprises rules for receiving events, rules for filtering events and rules for forwarding events to a one of the empirical recommendation systems.

According to another aspect of the present invention there is provided the above computer system in which the rule system comprises rules for preprocessing data prior to accessing a one of the empirical recommendation systems.

According to another aspect of the present invention there is provided the above computer system in which the rule system comprises rules for postprocessing data following the access of a one of the empirical recommendation systems.

According to another aspect of the present invention there is provided the above computer system in which the defined interface comprises a definition of means for obtaining recommendations based on a specified user from the one or more the empirical recommendation systems.

According to another aspect of the present invention there is provided the above computer system in which the defined interface comprises a definition of means for the one or more recommendation systems to prioritize items based on a specified user.

According to another aspect of the present invention there is provided the above computer system in which the recommendations of the system are provided to a web-based display system for the display of pages to a shopper in an electronic commerce site maintained for an on-line store.

According to another aspect of the present invention there is provided the above computer system in which the defined interface defines a means to make available to the one or more recommendation systems the following:

a) data uniquely identifying the shopper, b) data uniquely identifying the store, and c) a specified maximum number of recommendations.

According to another aspect of the present invention there is provided the above computer system in which the defined interface defines a means to make available to selected ones of the one or more recommendation systems one or more of the following:

d) a set of initial recommendations, e) a set of category information for constraining the recommendations to be returned, and f) information about the environment from which the rule system was invoked.

According to another aspect of the present invention there is provided a computer system for generating recommendations for personalization of an e-commerce site, the system comprising, a rule system for defining a set of rules, each rule having a predicate component and an action component, a set of empirical recommendation systems, a defined interface for accessing each of the recommendation systems to permit the recommendation system to be invoked from an action component in a rule in the set of rules in the rule system, and a set of event-listener connections, each connection comprising a means for passing data from the rule system to the empirical recommendation system for processing by the empirical recommendation.

According to another aspect of the present invention there is provided a computer program product for providing recommendations, the computer program product comprising a computer usable medium having computer readable code means embodied in said medium, comprising computer readable program code means for implementing the above-described systems.

According to another aspect of the present invention there is provided a method for generating a set of personalization recommendations using a rule system, and a set of empirical recommendation systems, the rule system comprising rules having predicates and actions, the method comprising the steps of defining an interface to permit the empirical recommendation systems to be called from the rule system, defining a set of rules in the rule system, selected rules in the set of rules comprising calls using the interface to empirical recommendation systems in the set of empirical recommendation systems, and invoking the rule system to provide a set of personalization recommendations by evaluating rule predicates and firing rule actions in the rule system and to call the empirical recommendation systems as defined in fired rule actions.

According to another aspect of the present invention there is provided the above method where the step of calling an empirical recommendation system defined in a fired rule action further comprises the step of establishing an event-listener connection to the empirical recommendation system to permit data to be provided to the empirical recommendation system.

According to another aspect of the present invention there is provided a computer program product for providing recommendations, the computer program product comprising a computer usable medium having computer readable code means embodied in said medium, comprising computer readable program code means for implementing the above-described methods.

It will be appreciated by those skilled in the art that the computer program can be stored in storage or transmitted as a signal, such as on a modulated carrier signal for use in a computer system, or on a network such as the Internet for use in a computer system.

Advantages of the present invention include a recommendation system that is able to incorporate both rule-based and non-rule-based systems.

DETAILED DESCRIPTION OF THE PREFERRED EMBODIMENT

Figure 1:
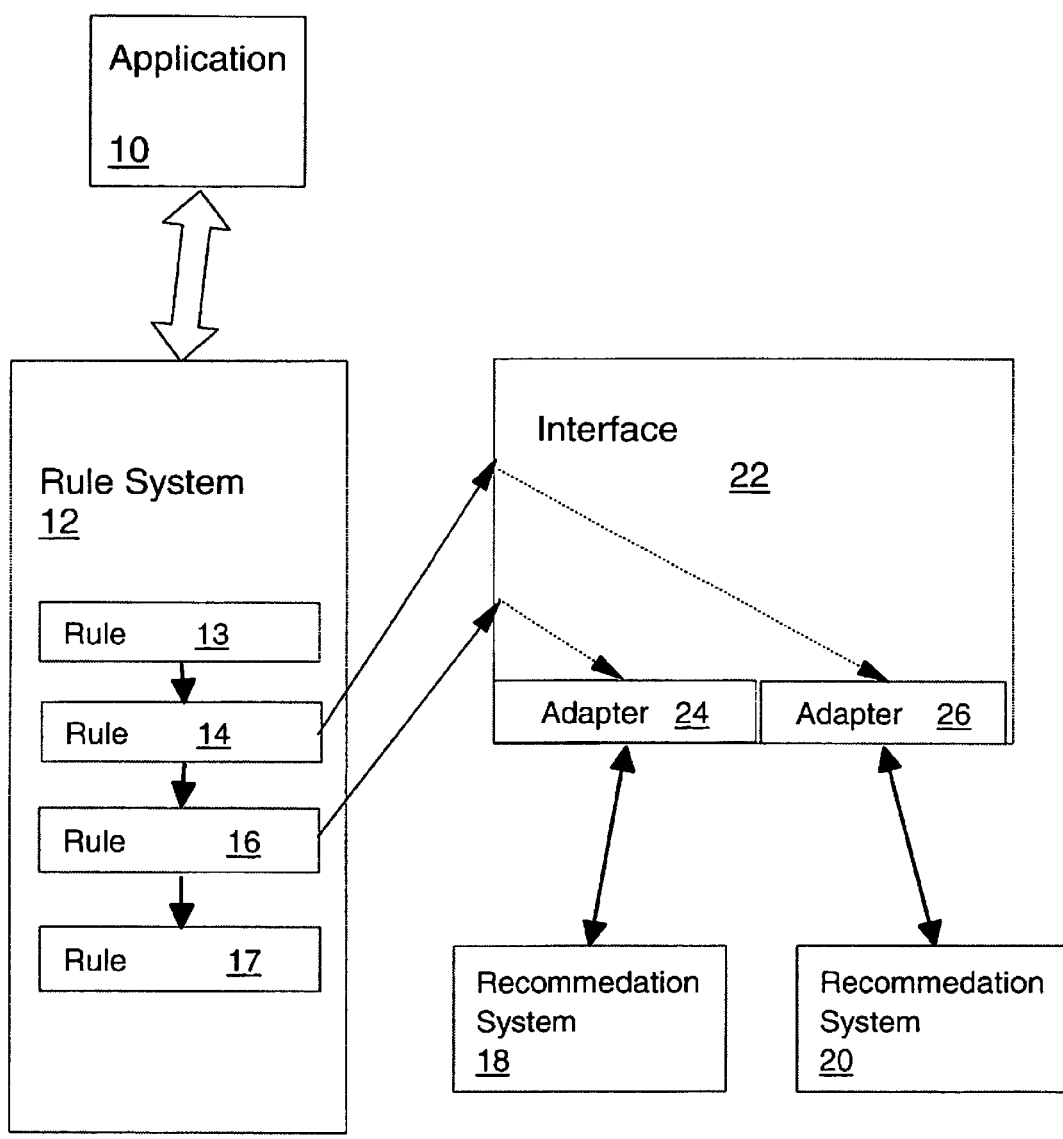
FIG. 1 is a block diagram illustrating an example recommendation system developed according to the preferred embodiment.

FIG. 1 shows a block diagram illustrating a simple example of the structure of the system of the preferred embodiment. Application 10 calls rule system 12 in the example. In practice, multiple applications may call rule system 12 and a single application 10 may also call multiple rule systems. For simplicity of presentation a single example of both an application and a rule system are shown in FIG. 1. In the preferred embodiment, application 10 is an e-commerce application that calls rule system 12 to obtain recommendations to permit suitably personalized pages to be presented to a user accessing application 10.

To implement the system of the preferred embodiment, rule system 12 may be any one of a number of commercially available systems that permit the definition and execution of rules. Such systems permit authors to define rules having predicates and actions. A rule predicate is evaluated in the rule system and if the predicate is satisfied then the associated action is executed. The author is able to define a set of rules and a rule engine will run on the set of rules to evaluate predicates and fire or execute the actions defined in the rules. Where a rule system is used alone to define recommendations in an e-commerce environment to provide for personalization, the rules are defined by an author so that the rules have that predicates reflecting expert-based knowledge of the e-commerce domain in question. Actions may involve calls to routines to obtain additional information or to mechanisms for displaying pages to the user of the system.

In the example of FIG. 1, rules 13, 14, 16, 17 are shown within rule system 12. The example of FIG. 1 also shows that recommendation systems 18, 20 are accessible from rule system 12, in the preferred embodiment. The integration points for recommendation systems 18, 20 into rule system 12 are rules 16, 14, respectively.

FIG. 1 also shows interface 22 having adapters 24, 26. Interface 22 is defined to permit rule system 12 to access recommendation systems 18, 20. In general, a defined interface is provided in the preferred embodiment to allow recommendation systems to be invoked from the action defined in a rule's predicate-action pair. In this way, a non-rule based recommendation system (an empirical recommendation system) may be accessed from a rule-based system in the preferred embodiment. Thus in the example of FIG. 1, both recommendation systems 18, 20 are empirical recommendation systems. By calling empirical recommendation systems from rules in a rule system, the advantages of a rule-based system may be combined with the advantages of an empirical personalization system.

In the preferred embodiment, rule system 12 accesses interface 22 to use recommendation systems 18, 20. Interface 22 is defined as a Java language interface. For recommendation systems 18, 20 to be called from rule system 12, the action component of a rule in rule system 12 defines a call to an object that instantiates a class defined using a Java interface. In FIG. 1 adapter 24 and adapter 26 are instances that support interface 22. Each instance is defined to use the API associated with a respective recommendation system. In the example of FIG. 1, adapter 24 is defined to call the API of recommendation system 18 and adapter 26 is defined to call the API of recommendation system 20.

In the example of FIG. 1, rule 14 is shown accessing recommendation system 20 by a call to interface 22. Interface 22 is instantiated by adapter 26 which is used to call the API for recommendation system 20. Similarly, rule 16 uses the interface 22 mechanism to access recommendation system 18. Adapter 24 is the object used to provide the calls to the API of recommendation system 18. As may be seen, the common interface 22 is available to all rules defined in rule system 12. A rule in rule system 12 will define what recommendation system it seeks to access and interface 22 makes available the functions for that recommendation system using the common interface.

By using the structure shown in FIG. 1, rule system 12 may be written independently of the API details of the different recommendation systems (18, 20 in FIG. 1). Interface 22 is defined to permit certain defined functionality to be accessed in a general way by rules in rule system 12. The rule definitions in rule system 12 therefore invoke the interface provided by interface 22 without requiring knowledge of the requirements for each of recommendation systems 18, 20. This permits different recommendation systems to be added to the system of the preferred embodiment without requiring significant changes to rule system 12. The addition of a new recommendation system will require a new adapter to be defined.

In the preferred embodiment, interface 22 may be defined by authors for specific applications seeking to access rule system 12. The functionality made available to rule system 12 by interface 22 is determined by what information is required by rule system 12 and application 10. Interface 22 permits the required functionality to be provided, where the recommendation systems accessed support the functionality. The system of the preferred embodiment provides that rule system 12 need not be designed to be dependent on the details of how different recommendation systems provide that functionality.

As referred to above, the preferred embodiment provides a personalization framework for e-commerce sites. Although interface 22 may be defined to provide different functions to rule system 12, there are defined generic interfaces in the preferred embodiment that are of use in obtaining recommendations to personalize an e-commerce site and that may be used by the author for that purpose. The generic interfaces of the preferred embodiment include interfaces that permit the following two functions to be carried out in reference to the recommendation system being accessed:

(i) get recommendation based on user; and
(ii) prioritize items based on user.

With respect to item (i) set out above, an author implementing rule system 12 and its interface to recommendation systems 18, 20 is able to define rules to supplement (i.e. filter or add) results from recommendation systems 18, 20. For example, it is possible to implement the filtering out of "low on stock" items or add in promotional items.

With respect to item (ii) above, the author is able to define rules that generate a set of results and to define a call to a recommendation system to prioritize those rule-generated results before returning to application 10.

Since these defined interfaces are integrated into rule system 12 in actions in defined rules, the number of possibilities for combinations of rule and empirical personalization is large. New interfaces to the recommendation systems can be defined as needed and easily introduced into the rule system.

As indicated above, although the invention has application in other contexts, the preferred embodiment system is used in an e-commerce environment in which personalization is provided for a shopper using a web browser to access information and products from an on-line store. In the preferred embodiment, the following information is made available to recommendation systems invoked in the rule system using interfaces as defined above:

1. information that uniquely identifies the shopper (e.g. shopperId);
2. information that uniquely identifies the shop/store that the shopper is visiting (e.g. storeId);
3. the maximum number of recommendations requested;
4. an optional set of initial recommendations (this is used for item prioritization);
5. an optional set of category information (e.g. a list of categoryId) to constrain the recommendations returned. For example, the requested recommendations must belong to these categories; and
6. information about the invocation environment The above information may be passed from rule system 12 to recommendation systems 18, 20, as required and specified by the interfaces built for the respective systems. The recommendation systems 18, 20 may or may not utilize the information provided to perform calculations within those systems to return appropriate recommendations.

In the preferred embodiment, rule system 12 may be configured to act as a preprocessor for the recommendation systems 18, 20. Rule 13 shown in rule system 12 of FIG. 1 may be defined to select and present data for recommendation systems 18, 20 to obtain optimum results from those recommendation systems as required by application 10. In addition, rules may be included in rule system 12 to carry out additional personalization based on results provided by recommendation systems 18, 20. Such a post-processing rule is shown in FIG. 1 by rule 17. In this way the recommendations and personalizations made available by recommendation systems 18, 20 are able to be fine-tuned and augmented by logic embodied in rule system 12 as shown in example rules 13, 17 in FIG. 1.

Although the primary implementation for the system is to allow rule systems to access empirical recommendation systems, the preferred embodiment permits rule system 12 to invoke a recommendation system that is itself a rule system. Rule systems may therefore be chained to rule systems which in turn call empirical recommendation systems.

When used directly by an application, as in the prior art, a non-rule-based recommendation system obtains data for use in generating recommendations from that application. In such an arrangement there is a "hard link" connection between the recommendation system and the application calling the recommendation system. Typically in the prior art, the access to a recommendation system by an application will require direct calls to the API of the recommendation system.

In the preferred embodiment system, however, recommendation systems 18, 20 obtain data via rule system 12. The mechanism used is an event-listener type of mechanism in which the listener will always act upon the events it listens to, unless logic is built into the listener code to do otherwise. Rule system 12 receives events and passes the events to the appropriate recommendation system. The rules within rule system 12, however, may filter the events that are made available to the appropriate recommendation system. This aspect of the preferred embodiment gives some control to the author of rules defined in rule system 12 to control data flow to recommendation systems 18, 20 or even to modify the content of the event between the event source (the process or component that raises the event) and the event listener.

The preferred embodiment includes an application interface to rule system 12 for passing in an event, and an event listener interface between rule system 12 and recommendation systems 18, 20. The key integration point here, again, is in the action clause of a rule (for example, rules 14, 16 in FIG. 1). The designer of the rules in rule system 12 is therefore able to control the data that is fed to recommendation systems 18, 20.

An example where such rule-defined control over the data flow is desirable is where a retail site is running a special promotion or event. The result can be that during the promotion or event there are more hits than is typical for the site. An empirical recommendation system associated with the personalization system will collect data relating to all such hits during the promotion or event and include that data in the set of data used to generate recommendations. Capturing each of the events (hits) in the appropriate recommendation system can therefore significantly skew the recommendations (buyers attending the on-line event may not be representative of buyers in general for the web site). Thus it may be desirable to temporarily stop capturing each event in the data feed. The data may be ignored or sampled at a slower rate (by capturing one out of every five hits, for example). Using the preferred embodiment, this type of control can be accomplish using rules in rule system 12. The data flow to empirical recommendation systems 18, 20 will be modified based on rule evaluation and execution to reflect the expected behaviour of buyers and potential buyers during the promotion or event on the web site.

Similarly, rules system 12 may be used to "kick start" non-rule-based recommendations related to a new product by passing data to a recommendation system where the data is generated from events relating to a similar product.

The preferred embodiment approach to the recommendation system data connection gives a symmetrical design to the overall rule system—recommendation system connection. Both data feed (input) and recommendations (output) for a recommendation system are handled through the rules mechanism in the related rules system.

The designer of the personalization system is able to use the rules system as a front-end for the recommendation systems available. Both types of system may be used together to drive the personalization of an e-commerce or other on-line site. The rule-based system integrates recommendations from empirical recommendation systems that are accessible using defined interfaces available to rules in the rule-based system.

Although a preferred embodiment of the present invention has been described here in detail, it will be appreciated by those skilled in the art that variations may be made thereto without departing from the spirit of the invention or the scope of the appended claims.

What is claimed:

1. A computer system for generating recommendations, the system comprising:
    a rule system for defining a set of rules, each rule having a predicate component and an action component,
    a set of recommendation systems, and
    a defined interface for accessing each of the recommendation systems in said set of recommendation systems to permit a one of the recommendation systems to be invoked from an action component in a rule in the set of rules in the rule system.

2. The computer system of claim 1 in which the set of recommendation systems comprises one or more empirical recommendation systems.

3. The computer system of claim 2, further comprising a set of connections, each connection comprising a means for passing data from the rule system to a one of the empirical recommendation systems for processing by the empirical recommendation system.

4. The computer system of claim 3 in which the means for passing data from the rule system to the empirical recommendation system comprises an event-listener connection.

5. The computer system of claim 4 in which the rule system comprises rules for receiving events, rules for filtering events and rules for forwarding events to a one of the empirical recommendation systems.

6. The computer system of claim 2 in which the rule system comprises rules for preprocessing data prior to accessing a one of the empirical recommendation systems.

7. The computer system of claim 2 in which the rule system comprises rules for postprocessing data following the access of a one of the empirical recommendation systems.

8. The computer system of claim 2 in which the defined interface comprises a definition of means for obtaining recommendations based on a specified user from the one or more empirical recommendation systems.

9. The computer system of claim 2 in which the defined interface comprises a definition of means for the one or more empirical recommendation systems to prioritize items based on a specified user.

10. The computer system of claim 3 in which the recommendations of the computer system are provided to a web-based display system for the display of pages to a shopper in an electronic commerce site maintained for an on-line store.

11. The computer system of claim 10 in which the defined interface defines a means to make available to the one or more empirical recommendation systems the following:
    a) data uniquely identifying the shopper,
    b) data uniquely identifying the store, and
    c) a specified maximum number of recommendations.

12. The computer system of claim 11 in which the defined interface defines a means to make available to selected ones of the one or more empirical recommendation systems one or more of the following:
    a) a set of initial recommendations,
    b) a set of category information for constraining the recommendations to be returned, and
    c) information about the environment from which the rule system was invoked.

13. A computer system for generating recommendations for personalization of an e-commerce site, the system comprising,
    a rule system for defining a set of rules, each rule having a predicate component and an action component, a set of empirical recommendation systems, a defined interface for accessing each of the empirical recommendation systems in said set of empirical recommendation systems to permit a one of the empirical recommendation systems to be invoked from an action component in a rule in the set of rules in the rule system, and a set of event-listener connections, each connection comprising a means for passing data from the rule system to the empirical recommendation system for processing by the empirical recommendation system.

14. The computer system of claim 13 in which the rule system comprises rules for preprocessing data prior to accessing a one of the empirical recommendation systems.

15. The computer system of claim 13 in which the rule system comprises rules for postprocessing data following the access of a one of the empirical recommendation systems.

16. The computer system of claim 13 in which the defined interface comprises a definition of means for obtaining recommendations from the set of empirical recommendation systems based on a specified user accessing the e-commerce site.

17. The computer system of claim 13 in which the defined interface comprises a definition of means for the set of empirical recommendation systems to prioritize items based on a specified user accessing the e-commerce site.

18. The computer system of claim 13 in which the recommendations of the computer system are provided to a web-based display system for the display of pages to a user accessing the e-commerce site.

19. The computer system of claim 13 in which the defined interface defines a means to make available to the set of empirical recommendation systems the following:
   a) data uniquely identifying a consumer accessing the e-commerce site,
   b) data uniquely identifying the e-commerce site, and
   c) a specified maximum number of recommendations.

20. The computer system of claim 19 in which the defined interface defines a means to make available to selected ones of the set of empirical recommendation systems one or more of the following:
   a) a set of initial recommendations,
   b) a set of category information for constraining the recommendations to be returned, and
   c) information about the environment from which the rule system was invoked.

21. A method for generating a set of personalization recommendations using a rule system, and a set of empirical recommendation systems, the rule system comprising rules having predicates and actions, the method comprising the steps of:
   defining an interface to permit the empirical recommendation systems in said set of empirical recommendation systems to be called from the rule system,
   defining a set of rules in the rule system, selected rules in the set of rules comprising calls using the interface to the empirical recommendation systems, and
   invoking the rule system to provide a set of personalization recommendations by evaluating rule predicates and firing rule actions in the rule system and to call one or more of the empirical recommendation systems as defined in the fired rule actions.

22. The method of claim 21 where the step of calling an empirical recommendation system defined in a fired rule action further comprises the step of establishing an event-listener connection to the empirical recommendation system to permit data to be provided to the empirical recommendation system.

23. The method of claim 22 in which the step of defining rules in the rule system further comprises the step of defining preprocessing rules for preprocessing event data before passing an event to the empirical recommendation system.

24. The method of claim 22 in which the step of defining rules in the rule system further comprises the step of defining postprocessing rules for postprocessing recommendations provided by the empirical recommendation system.

25. A computer program product comprising a computer usable medium having computer readable code means embodied in said medium, comprising computer readable program code means for generating recommendations, the computer readable program code means directing a computer to perform the steps of:
   defining a set of rules in a rule system, each rule having a predicate component and an action component; and
   defining an interface for accessing each recommendation system in a set of recommendation systems to permit at least one recommendation system from the set of recommendation systems to be invoked from an action component in a rule in the set of rules in the rule system.

26. The computer program product of claim 25 in which the set of recommendation systems comprises one or more empirical recommendation systems.

27. The computer program product of claim 26, further comprising passing data from the rule system to a one of the empirical recommendation systems for processing by the empirical recommendation system.

28. The computer program product of claim 27 wherein passing data from the rule system to the empirical recommendation system utilizes an event-listener connection.

29. The computer program product of claim 28 which the rule system comprises rules for receiving events, rules for filtering events and rules for forwarding events to a one of the empirical recommendation systems.

30. The computer program product of claim 26 in which the rule system comprises rules for preprocessing data prior to accessing a one of the empirical recommendation systems.

31. The computer program product of claim 26 in which the rule system comprises rules for postprocessing data following the access of a one of the empirical recommendation systems.

32. The computer program product of claim 26 in which the defined interface comprises a definition of means for obtaining recommendations based on a specified user from the one or more empirical recommendation systems.

33. The computer program product of claim 26 in which the defined interface comprises a definition of means for the one or more empirical recommendation systems to prioritize items based on a specified user.

34. The computer program product of claim 27 in which the recommendations are provided to a web-based display system for the display of pages to a shopper in an electronic commerce site maintained for an on-line store.

35. The computer program product of claim 34 in which the defined interface defines a means to make available to the one or more empirical recommendation systems the following:
   a) data uniquely identifying the shopper;
   b) data uniquely identifying the store; and
   c) a specified maximum number of recommendations.

36. The computer program product of claim 35 which the defined interface defines a means to make available to selected ones of the one or more empirical recommendation systems one or more of the following:
   a) a set of initial recommendations;
   b) a set of category information for constraining the recommendations t be returned; and
   c) information about the environment from which the rule system was invoked.

37. A computer program product comprising a computer usable medium having computer readable code means embodied in said medium, comprising computer readable program code means for generating recommendations for personalization of an e-commerce site, the computer readable program code means directing a computer to perform the steps of:
   defining a set of rules in a rule system, each rule having a predicate component and an action component;
   defining an interface for accessing each empirical recommendation system in a set of empirical recommendation systems to permit at least one empirical recommendation system from the set of empirical recommendation systems to be invoked from action component in a rule in the set of rules in the rule system; and
   listening for events utilizing a set of event-listener connections, each connection comprising a means for passing data from the rule system to the at least one empiric recommendation system for processing by the empirical recommendation system.

38. The computer program product of claim 37 in which the rule system comprises rules for preprocessing data prior to accessing an empirical recommendation system from the set of empirical recommendation systems.

39. The computer program product of claim 37 in which the rule system comprises rules for postprocessing data following the access of an empirical recommendation systems from the set of empirical recommendation systems.

40. The computer program product of claim 37 in which the defined interface comprises a definition of means for obtaining recommendations from the set of empirical recommendation systems based on a specified user accessing the e-commerce site.

41. The computer program product of claim 37 in which the defined interface comprises a definition of means for the set of empirical recommendation systems to prioritize items based on a specified user accessing the e-commerce site.

42. The computer program product of claim 37 in which the recommendations are provided to a web-based display system for the display of pages to a user accessing the e-commerce site.

43. The computer program product of claim 37 which the defined interface defines a means to make available to the set of empirical recommendation systems the following:
   a) data uniquely identifying a consumer accessing the e-commerce site;
   b) data uniquely identifying the e-commerce site; and
   c) a specified maximum number of recommendations.

44. The computer program product of claim 43 in which the defined interface defines a means to make available to selected ones of the set of empirical recommendation systems s one or more of the following:
   a) a set of initial recommendations;
   b) a set of category information for constraining the recommendations to be returned; and
   c) information about the environment from which the rule system was invoked.

* * * * *